(12) United States Patent
Shi et al.

(10) Patent No.: US 10,670,722 B2
(45) Date of Patent: Jun. 2, 2020

(54) INCREASE DEPTH RESOLUTION AND DEPTH ACCURACY IN TOF SENSORS BY AVOIDING HISTOGRAMMIZATION

(71) Applicant: Samsung Electronics Co., Ltd., Suwon-si, Gyeonggi-do (KR)

(72) Inventors: Lilong Shi, Pasadena, CA (US); Yibing Michelle Wang, Temple City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 323 days.

(21) Appl. No.: 15/807,334

(22) Filed: Nov. 8, 2017

(65) Prior Publication Data

US 2019/0056500 A1 Feb. 21, 2019

Related U.S. Application Data

(60) Provisional application No. 62/545,976, filed on Aug. 15, 2017.

(51) Int. Cl.
| | |
|---|---|
| G01S 17/42 | (2006.01) |
| G01S 17/88 | (2006.01) |
| G01S 17/89 | (2020.01) |
| G01S 7/4865 | (2020.01) |
| G01S 17/10 | (2020.01) |
| G01S 7/481 | (2006.01) |
| G01S 17/66 | (2006.01) |

(52) U.S. Cl.
CPC ............ G01S 17/42 (2013.01); G01S 7/4865 (2013.01); G01S 17/10 (2013.01); G01S 17/88 (2013.01); G01S 17/89 (2013.01); *G01S 7/4811* (2013.01); *G01S 17/66* (2013.01)

(58) Field of Classification Search
CPC ........ G01S 7/4865; G01S 17/42; G01S 17/89; G01S 17/10; G01S 17/88; G01S 17/66; G01S 7/4811
USPC ...................................................... 356/5.01
See application file for complete search history.

(56) References Cited

U.S. PATENT DOCUMENTS

| | | | |
|---|---|---|---|
| 7,054,655 B2 | 5/2006 | Ubuki et al. | |
| 7,148,974 B1 | 12/2006 | Schmitt et al. | |
| 2002/0060784 A1 | 5/2002 | Pack et al. | |
| 2010/0020306 A1 | 1/2010 | Hall | |
| 2015/0379766 A1 | 12/2015 | Newman et al. | |
| 2016/0274589 A1* | 9/2016 | Templeton | G05D 1/0246 |

* cited by examiner

*Primary Examiner* — Daniel L Murphy
(74) *Attorney, Agent, or Firm* — Renaissance IP Law Group LLP

(57) ABSTRACT

A method is disclosed to determine a traveling time for a plurality of received light pulses that reflected and returned from an object. Each returned light pulse is associated with a timestamp indicating a time between a transmission time of a corresponding light pulse and a time of arrival of the returned light pulse. For each timestamp, a number C is determined of time stamps that are subsequent to the timestamp and within a predetermined time window after the timestamp. A maximum number C is determined, and an index i is determined for the maximum number C. A traveling time is determined for the plurality of light pulses as an average of the timestamp having a same index as the maximum number C and timestamps that are within the predetermined time window after the timestamp having the same index as the maximum number C.

20 Claims, 3 Drawing Sheets

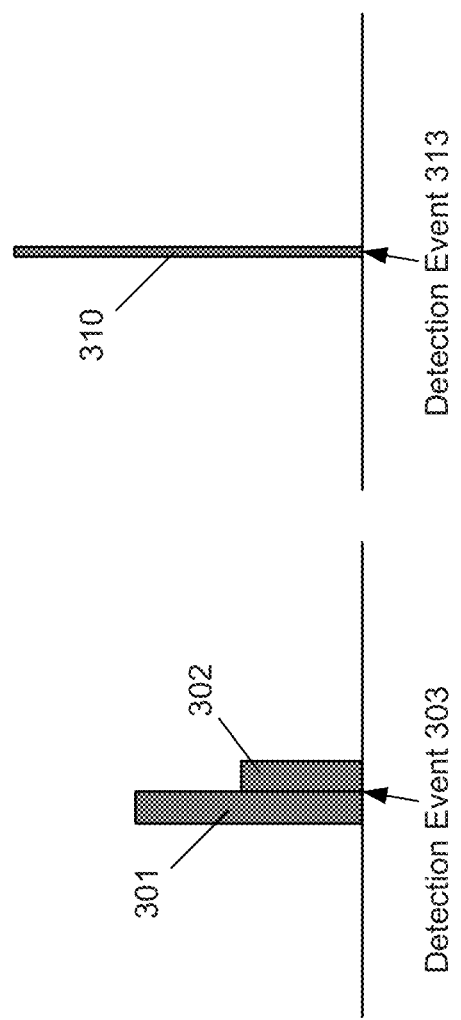

INCREASE DEPTH RESOLUTION AND DEPTH ACCURACY IN TOF SENSORS BY AVOIDING HISTOGRAMMIZATION

CROSS-REFERENCE TO RELATED APPLICATION

This patent application claims the priority benefit under 35 U.S.C. § 119(e) of U.S. Provisional Patent Application No. 62/545,976, filed on Aug. 15, 2017, the disclosure of which is incorporated herein by reference in its entirety.

TECHNICAL FIELD

The subject matter disclosed herein generally relates to time of flight (ToF) sensors, and more particularly, to a technique for determining travel time for light pulses.

BACKGROUND

In a Light Detection and Ranging (LIDAR) based three-dimensional (3D) imaging system, generally dozens/hundreds of photon-detection events are recorded after a series of repeating laser light pulses emitted. Conventionally, the photon-detection events are formed into a time histogram representing the photon detection events at a pixel. Based on the histogram, the laser pulse travelling time is determined, which usually corresponds to a peak of the histogram.

There is, however, is a drawback associated with the conventional approach due to histogram binning. That is, the time of a photon detection event is quantized to one of a finite number of histogram bins, which results in a quantization error. The quantization process also reduces depth resolution, as well as increases quantization error. For example, for a LIDAR camera system that measures distance maximum up to 40 meters, if the histogram includes 280 bins, the depth resolution is 15 cm, and the depth error is about 4 cm. That means that the LIDAR camera system cannot distinguish between objects that are 15 cm apart from the camera system, and will have a depth error of about 4 cm.

Simply increasing the number of bins in the histogram may help increase the depth resolution. Unfortunately, other issues also may occur when the number of bins of a histogram is increased. First, an increase in the hardware resources and physical space are needed to make a bin. An increase in the number of histogram bins dramatically increases the size of a sensor. Secondly, smaller bins make peak detection difficult because a sharp peak that may occur in a histogram having larger bins would be more spread-out in a histogram having smaller bins. As a result the depth error increases.

SUMMARY

An example embodiment provides a method to determine a traveling time for a plurality of light pulses that may include: transmitting a predetermined number N of light pulses and receiving returned light pulses $P_i$ in which each returned light pulse $P_i$ may be associated with a timestamp $t_i$ indicating a time between a transmission time of a corresponding light pulse and a time of arrival of the returned light pulse in which i=1, . . . , N and N>1; determining for each timestamp $t_i$ a number $C_i$ of time stamps subsequent to the timestamp $t_i$ and within a predetermined time window TW after the timestamp $t_i$; determining a maximum number $C_i$; determining an index i for the maximum number $C_i$; and determining a traveling time for the plurality of light pulses as an average of the timestamp having a same index as the maximum number $C_i$ and timestamps that are within the predetermined time window TW after the timestamp having the same index as the maximum number $C_i$. In one embodiment, determining the traveling time for the plurality of pulses further may include determining the traveling time as a weighted average of the timestamps associated with the timestamp determined to have the same index as the maximum number $C_i$ by setting a weight of timestamps that are within the predetermined time window TW after the time stamp determined to have the same index as the maximum number $C_i$ that are near a middle of the predetermined time window TW have a different weight than timestamps near a beginning or an end of the predetermined time window TW.

Another example embodiment provides a method to determine a traveling time for a plurality of light pulses that may include: transmitting a predetermined number N of light pulses and receiving returned light pulses $P_i$ in which each returned light pulse $P_i$ may be associated with a timestamp $t_i$ indicating a time between a transmission time of a corresponding light pulse and a time of arrival of the returned light pulse in which i=1, . . . , N and N>1; arranging the timestamps $t_i$ in a received chronological order; determining for each timestamp $t_i$ a number $C_i$ of time stamps subsequent to the timestamp $t_i$ and within a predetermined time window TW after the timestamp $t_i$; determining an index i for a maximum number $C_i$; and determining a traveling time for the plurality of light pulses as a timestamp $t_i$ having a same index as the maximum number $C_i$. In one embodiment, determining the traveling time for the plurality of light pulses may further include determining the traveling time for the plurality of light pulses as an average of the timestamp having the same index as the maximum number $C_i$ and timestamps that are within the predetermined time window TW after the timestamp having the same index as the maximum number $C_i$. In another embodiment, determining the traveling time for the plurality of pulses may further include determining the traveling time as a weighted average of timestamp having the same index as the maximum number $C_i$ and timestamps that are within the predetermined time window TW after the timestamp having the same index as the maximum number $C_i$ in which timestamps near a middle of the predetermined time window TW have a different weight than timestamps near a beginning or an end of the predetermined time window TW.

Still another example embodiment provides a method to determine a traveling time for a plurality of light pulses that may include: transmitting a predetermined number N of light pulses and receiving returned light pulses $P_i$ in which each returned light pulse $P_i$ may be associated with a timestamp $t_i$ indicating a time between a transmission time of a corresponding light pulse and a time of arrival of the returned light pulse in which i=1, . . . , N and N>1; determining for each timestamp $t_i$ a number $C_i$ of timestamps subsequent to the timestamp $t_i$ and within a predetermined time window TW after the timestamp $t_i$; determining an index i for a maximum number $C_i$; and determining a traveling time for the plurality of light pulses as a timestamp $t_i$ having a same index as the maximum number $C_i$. In one embodiment, determining the traveling time for the plurality of light pulses may further include determining the traveling time for the plurality of light pulses as an average of the timestamp having the same index as the maximum number $C_i$ and timestamps that are within the predetermined time window TW after the timestamp having the same index as the maximum number $C_i$. In another embodiment, determining the traveling time for the plurality of pulses may further include determining the traveling time as a weighted average of the timestamp having the same index as the maximum number $C_i$ and timestamps that are within the predetermined time window TW after the timestamp having the same index as the maximum number $C_i$ in which timestamps near a middle of the predetermined time window TW have a different weight than timestamps near a beginning or an end of the predetermined time window TW.

BRIEF DESCRIPTION OF THE DRAWINGS

In the following section, the aspects of the subject matter disclosed herein will be described with reference to exemplary embodiments illustrated in the figures, in which:

FIGS. 3A and 3B respectively depict a travel time ambiguity that may occur with a conventional binning technique and how the technique disclosed herein avoids such an ambiguity.

DETAILED DESCRIPTION

Figure 1A:
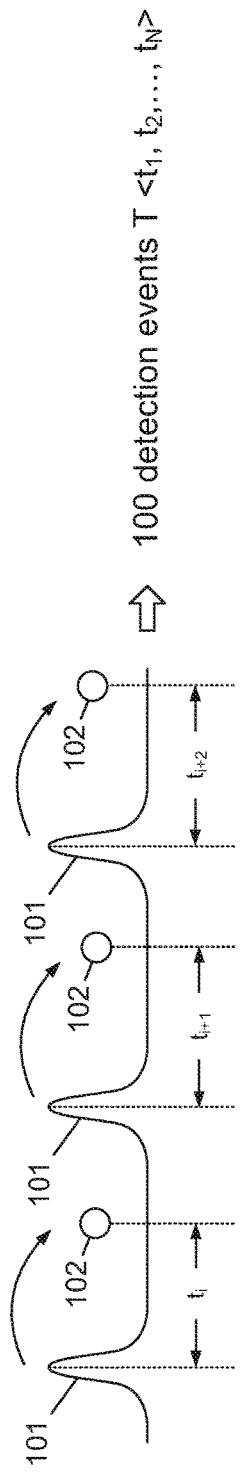
FIG. 1A depicts a part of a sequence of laser light pulses, such as LIDAR light pulses, and photon-detection events.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein provides a technique that eliminates histograms from determining a traveling time of light pulses for a LIDAR-based system. Additionally, the subject matter disclosed herein provides a technique that results infinite precision, increases the depth resolution, and reduces the depth error of a determined traveling time for light pulses of a LIDAR-based system, while eliminating quantization error associated with conventional histogram-based binning techniques. Simulation results show that for one example embodiment of a LIDAR-based system, the technique disclosed herein may increase the depth resolution from about 16 cm to about 1 cm, and reduces depth error caused by quantization by about 4 cm in comparison to the conventional LIDAR camera system described in the Background portion above. Further, the technique disclosed herein avoids the situation in which detected light-pulse events spread out into adjacent histogram bins, thereby reducing peak-detection accuracy experienced by a conventional binning technique.

FIG. 1A depicts a part of a sequence of laser light pulses 101, such as LIDAR light pulses, and photon-detection events 102. The time t between a light pulse 101 and a corresponding photon-detection event (detection event) 102 represents a traveling time of the light pulse transmitted by a light source (not shown) to an object that reflects the light pulse and then back to a sensor (not shown) that detects the photon-detection event. The traveling time of a light pulse corresponds to a distance between the light source/sensor and an object.

The detection events 102 form a set of detection events $T<t_1, t_2, \ldots, t_N>$. In one embodiment, a predetermined number N, such as N=100, of light pulses 101 may be transmitted and a corresponding number N of detection events may be detected. In another embodiment, a predetermined number N may be transmitted that is different from 100. Not every light pulse 101 has a corresponding detection event 102, so in some cases the total number of detection events in a set T may be less than N. The detection events 102 are timestamped with information that represents a difference in time between the transmission of a light pulse 101 and the corresponding detection event 102. The timestamped detection events 102 may be accumulated in a memory (not shown).

Figure 2:
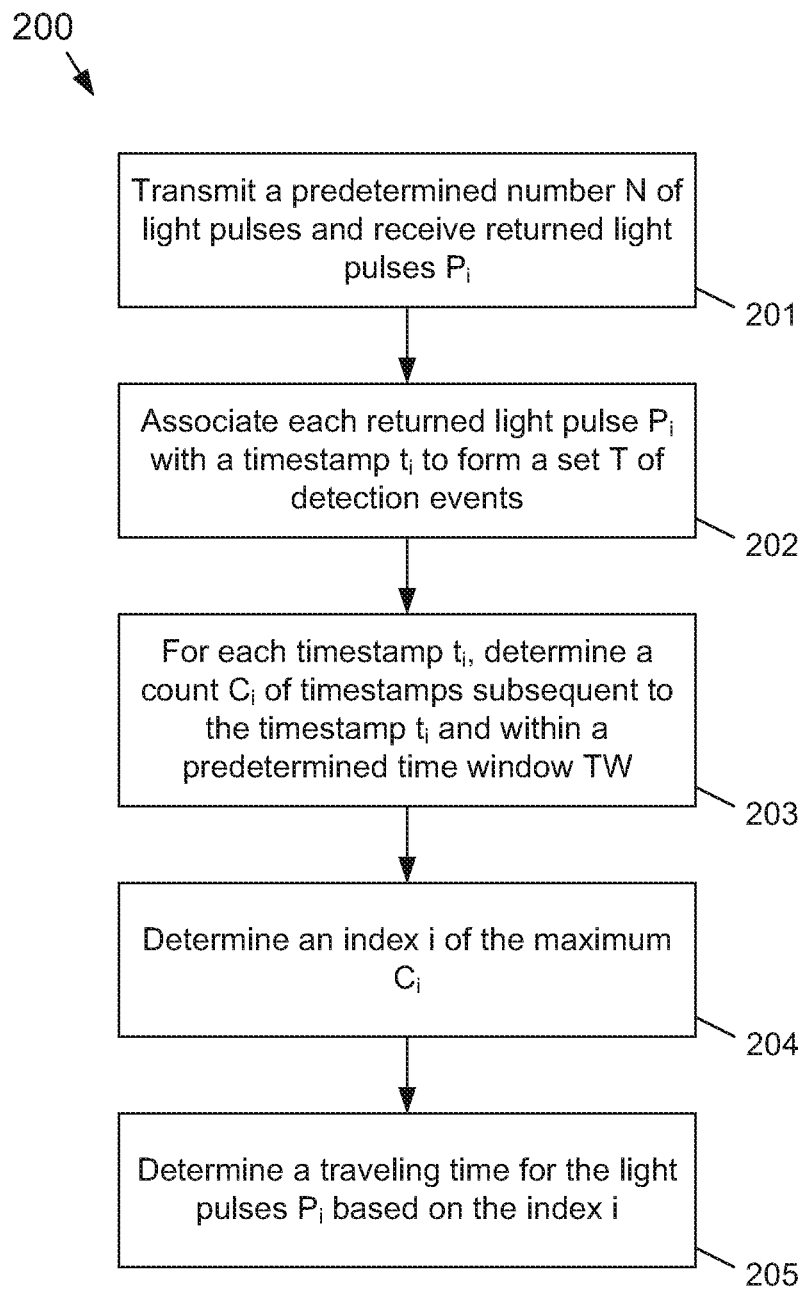
FIG. 2 is a flow diagram of a method to determine a traveling time for a plurality of light pulses according to the subject matter disclosed herein.

FIG. 2 is a flow diagram 200 of a method to determine a traveling time for a plurality of light pulses according to the subject matter disclosed herein. At 201, a predetermined number N of light pulses $P_i$ are transmitted and corresponding detection events are registered. In one embodiment, N may be equal to 100. In another embodiment, N may be equal to another whole number.

At 202, each detection event is associated with a timestamp that indicates a time between a transmission time of a light pulse and a time of arrival of a corresponding returned light pulse to form a detection-event set T<$t_1$, $t_2$, . . . , $t_N$>. This is depicted by FIG. 1A. In some instances, the detection-event set T may contain fewer elements that the predetermined number N.

Figure 1B:
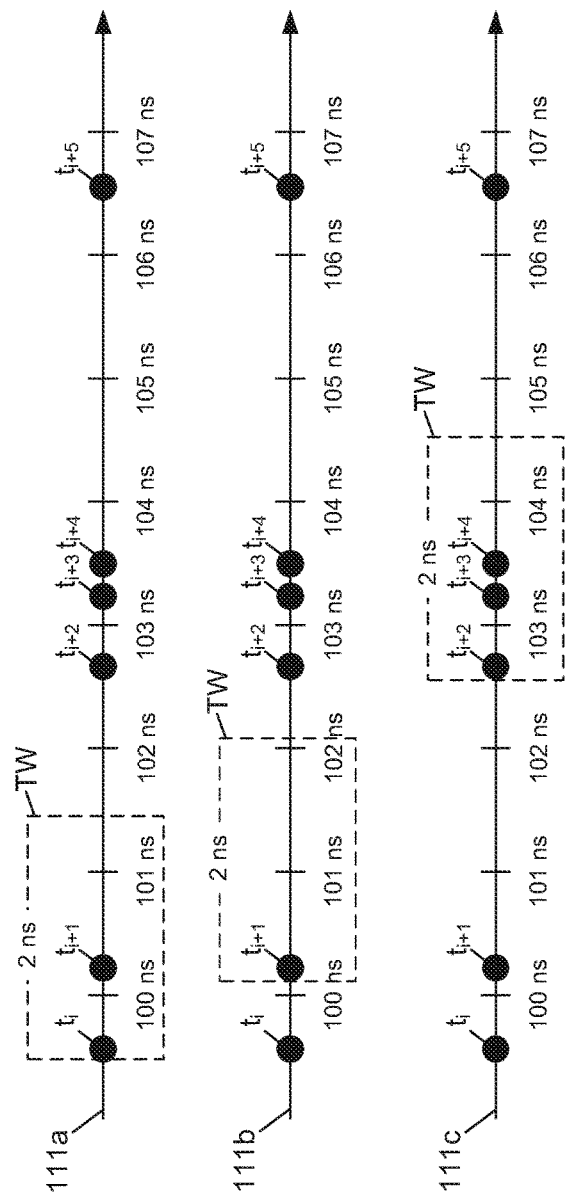
FIG. 1B depicts three timelines on which only five elements of an example detection-event set T have been plotted according to the subject matter disclosed herein.

At 203, for each timestamp $t_i$ of the detection-event set T, a count number $C_i$ of time stamps subsequent to the timestamp $t_i$ and within a predetermined time window TW after the timestamp $t_i$ is determined. For example, FIG. 1B depicts a first timeline 111a on which only six elements of an example detection-event set T have been plotted. The six elements have been labeled at detection events $t_i$ through $t_{i+5}$ for convenience. A predetermined time window TW of, for example, 2 ns, is used starting at the first detection event $t_i$ and a count $C_i$ is determined of the number of detection events that are subsequent to the first detection event $t_i$ and are within the time window TW. In this case, only the detection event $t_{i+1}$ falls within the time window TW, so $C_i$=1. It should be understood that the predetermined time window TW could be selected to be different from 2 ns. Continuing with the example, the time window TW is moved to the second detection event $t_{i+1}$, as shown on the timeline 111b, and the count $C_{i+1}$ is determined to be 1. The time window TW is then moved to the third detection event $t_{i+2}$, as shown on the timeline 111c, and the count $C_{i+2}$ is determined to be 3, and so on.

At 204, the index i of the count C that is maximum is used at 205 to determine the detection event having the same index i, which in one embodiment represents the traveling time for the plurality of light pulses.

In another example embodiment, the traveling time for the plurality of light pulses is determined at 205 to be an average of the timestamp having a same index as the maximum number $C_i$ and timestamps that are within the predetermined time window TW after the timestamp having the same index as the maximum number $C_i$.

In still another example embodiment, the traveling time for the plurality of pulses is determined at 205 to be a weighted average of the timestamps of the timestamp having the same index as the maximum number $C_i$ and timestamps that are within the predetermined time window TW after the timestamp having the same index as the maximum number $C_i$ in which timestamps near a middle of the predetermined time window TW may have a different weight than timestamps near a beginning and/or near an end of the predetermined time window TW. In one embodiment, timestamps near the middle of the predetermined time window TW may have a greater weight than timestamps near the beginning and/or near the end of the predetermined time window TW. This particular embodiment may be used to account for the shape of a returned light pulse, which may have a more Gaussian shape than a square pulse. For example, timestamps near a middle of a predetermined time window TW may be weighted by a multiplier 2.0, whereas timestamps near the edges of the time window TW may be weighted by a multiplier 0.5. In another embodiment, other weights may be used. In still another embodiment, the magnitude of a weight may be based on a position of the timestamp within a time window TW.

FIGS. 3A and 3B respectively depict a travel time ambiguity that may occur with a conventional binning technique and how the technique disclosed herein avoids such an ambiguity. More specifically, FIG. 3A depicts example bins 301 and 302 in a conventional histogram-based system. If a detection event 303 occurs on the boundary of the bins 301 and 302, the detection event 303 will be placed in either bin 301 or 302, causing an ambiguity with respect to the actual detection event 303. In contrast to a conventional histogram-based technique, the technique disclosed herein will accurately associate a detection event 313 with a travel time 310 as depicted in FIG. 3B. Thus, the technique disclosed herein avoids the situation in which detected light-pulse events spread out into adjacent histogram bins by providing infinite precision, which in a conventional histogram-based system causes a reduced peak-detection accuracy.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to determine a traveling time for a plurality of light pulses, the method comprising:
   transmitting a predetermined number N of light pulses and receiving returned light pulses Pi, each returned light pulse Pi being associated with a timestamp ti indicating a time between a transmission time of a corresponding light pulse and a time of arrival of the returned light pulse in which i=1, . . . , N and N>1 and indicating a chronological order of each returned light pulse Pi;
   determining for each timestamp ti a number Ci of time stamps subsequent to the timestamp ti and within a predetermined time window TW after the timestamp ti;
   determining a maximum number Ci;
   determining an index i for the maximum number Ci; and
   determining a traveling time for the plurality of light pulses as an average of the timestamp having a same index as the maximum number Ci and timestamps that are within the predetermined time window TW after the timestamp having the same index as the maximum number Ci.

2. The method of claim 1, wherein determining the traveling time for the plurality of pulses further comprises determining the traveling time as a weighted average of timestamps that are within the predetermined time window TW after the timestamp having the same index as the index of the maximum number Ci and timestamps in which timestamps near a middle of the predetermined time window TW have a different weight than timestamps near a beginning or an end of the predetermined time window TW.

3. The method of claim 1, wherein the light pulses are LIDAR pulses.

4. The method of claim 1, wherein N is 100.

5. The method of claim 1, wherein the predetermined time window TW is 2 ns.

6. The method of claim 1, wherein the determined traveling time comprises no bin-based quantizing error.

7. A method to determine a traveling time for a plurality of light pulses, the method comprising:
- transmitting a predetermined number N of light pulses and receiving returned light pulses Pi, each returned light pulse Pi being associated with a timestamp ti indicating a time between a transmission time of a corresponding light pulse and a time of arrival of the returned light pulse in which i=1, . . . , N and N>1 and indicating a chronological order of each returned light pulse Pi;
- arranging the timestamps ti in a received chronological order;
- determining for each timestamp ti a number Ci of time stamps subsequent to the timestamp ti and within a predetermined time window TW after the timestamp ti;
- determining an index i for a maximum number Ci; and
- determining a traveling time for the plurality of light pulses as a timestamp ti having a same index as the maximum number Ci.

8. The method of claim 7, wherein determining the traveling time for the plurality of light pulses further comprises determining the traveling time for the plurality of light pulses as an average of the timestamp having the same index as the maximum number Ci and timestamps that are within the predetermined time window TW after the timestamp having the same index as the maximum number Ci.

9. The method of claim 8, wherein determining the traveling time for the plurality of pulses further comprises determining the traveling time as a weighted average of timestamp having the same index as the maximum number Ci and timestamps that are within the predetermined time window TW after the timestamp having the same index as the maximum number Ci in which timestamps near a middle of the predetermined time window TW have a different weight than timestamps near a beginning or an end of the predetermined time window TW.

10. The method of claim 7, wherein the light pulses are LIDAR pulses.

11. The method of claim 7, wherein N is 100.

12. The method of claim 7, wherein the predetermined time window TW is 2 ns.

13. The method of claim 7, wherein the determined traveling time comprises no bin-based quantizing error.

14. A method to determine a traveling time for a plurality of light pulses, the method comprising:
- transmitting a predetermined number N of light pulses and receiving returned light pulses Pi, each returned light pulse Pi being associated with a timestamp ti indicating a time between a transmission time of a corresponding light pulse and a time of arrival of the returned light pulse in which i=1, . . . , N and N>1 and indicating a chronological order of each returned light pulse Pi;
- determining for each timestamp ti a number Ci of timestamps subsequent to the timestamp ti and within a predetermined time window TW after the timestamp ti;
- determining an index i for a maximum number Ci; and
- determining a traveling time for the plurality of light pulses as a timestamp ti having a same index as the maximum number Ci.

15. The method of claim 14, wherein determining the traveling time for the plurality of light pulses further comprises determining the traveling time for the plurality of light pulses as an average of the timestamp having the same index as the maximum number Ci and timestamps that are within the predetermined time window TW after the timestamp having the same index as the maximum number Ci.

16. The method of claim 15, wherein determining the traveling time for the plurality of pulses further comprises determining the traveling time as a weighted average of the timestamp having the same index as the maximum number Ci and timestamps that are within the predetermined time window TW after the timestamp having the same index as the maximum number Ci in which timestamps near a middle of the predetermined time window TW have a different weight than timestamps near a beginning or an end of the predetermined time window TW.

17. The method of claim 14 wherein the light pulses are LIDAR pulses.

18. The method of claim 14, wherein N is 100.

19. The method of claim 14, wherein the predetermined time window TW is 2 ns.

20. The method of claim 14, wherein the determined traveling time comprises no bin-based quantizing error.

* * * * *